(12) United States Patent
Lässle et al.

(10) Patent No.: US 6,948,018 B2
(45) Date of Patent: Sep. 20, 2005

(54) METHOD AND SYSTEM FOR EXCHANGING DATA

(75) Inventors: Hans-Peter Lässle, Usingen (DE); Dietmar Schmid, Vilmar (DE); Dirk Zimmermann, Sulzbach A.TS. (DE)

(73) Assignee: Siemens Aktiengesellschaft, Munich (DE)

( * ) Notice: Subject to any disclaimer, the term of this patent is extended or adjusted under 35 U.S.C. 154(b) by 434 days.

(21) Appl. No.: 10/026,071

(22) Filed: Dec. 24, 2001

(65) Prior Publication Data

US 2002/0106030 A1 Aug. 8, 2002

(30) Foreign Application Priority Data

Dec. 22, 2000 (DE) ......................................... 100 64 593

(51) Int. Cl.⁷ .............................................. G06F 13/00
(52) U.S. Cl. ...................................................... 710/110
(58) Field of Search ................................ 710/306, 308, 710/311, 313, 316, 317, 52, 260, 264, 110; 711/167, 105

(56) References Cited

U.S. PATENT DOCUMENTS 5,781,746 A * 7/1998 Fleck ......................... 710/306
6,530,006 B1 * 3/2003 Dodd et al. ................. 711/167

FOREIGN PATENT DOCUMENTS

| DE | 44 02 136 A1 | 7/1995 |
| DE | 44 24 709 A1 | 1/1996 |
| DE | 196 12 318 A1 | 10/1997 |

* cited by examiner

Primary Examiner—Khanh Dang
(74) Attorney, Agent, or Firm—Laurence A. Greenberg; Werner H. Stemer; Ralph E. Locher

(57) ABSTRACT

A method and a system exchange data between a program-controlled device, in particular a microcontroller, and a logic circuit. A control signal is transmitted from the program-controlled device to the logic circuit along a first line. A bidirectionally usable, second line is placed in the dominant state by the logic circuit if a data transmission is to be made by the logic circuit.

11 Claims, 3 Drawing Sheets

METHOD AND SYSTEM FOR EXCHANGING DATA

BACKGROUND OF THE INVENTION

Field of the Invention

The invention relates to a method and a system for exchanging data between a program-controlled device, in particular a microcontroller, and a logic circuit.

SUMMARY OF THE INVENTION

It is accordingly an object of the invention to provide a method and system for exchanging data that overcomes the hereinafore-mentioned disadvantages of the heretofore-known devices of this general type and that minimize the required lines and connections.

With the foregoing and other objects in view, there is provided, in accordance with the invention, a method for exchanging data between a program-controlled device and a logic circuit. The first step of the method is providing a first line connecting the program-controlled device and the logic circuit. The next step is providing a bidirectionally usable second line connecting the program-controlled device and the logic circuit. The next step is transmitting a control signal from the program-controlled device to the logic circuit over the first line. The next step is placing the second line in a dominant state with the logic circuit when the logic circuit is to make a data transmission.

With the objects of the invention in view, there is also provided a system for exchanging data. The system includes a program-controlled device, a logic circuit, a first line, and a second line. The first line conducts a control signal from the program-controlled device to the logic circuit. The bidirectionally usable, second line connects the program-controlled device to the logic circuit. The logic circuit can place the second line in a dominant state when data transmission is to be made by the logic circuit.

When a program-controlled device, in particular a microcontroller, is connected to a logic circuit, for example a PLD circuit, which also operates in accordance with a program, data is exchanged in both directions, and simultaneously data is transmitted at the request of the logic circuit.

This object is achieved with the method according to the invention in that a control signal (i.e., a strobe) is transmitted from the program-controlled device to the logic circuit along a first line, and in that at least one bidirectionally usable, second line is placed in the dominant state by the logic circuit if a data transmission is to be made by the logic circuit.

The method according to the invention can be applied particularly advantageously if the logic circuit itself requests a data transmission. This is the case in particular if the logic circuit receives input variables independently of the microcontroller. This is the case for example with a radio locking circuit for motor vehicles in which the radio receiver and the logic circuit form one unit. The expenditure in terms of lines and connections is particularly low when the method according to the invention is applied, if, for the bidirectional transmission of data, only an individual, second line is used for the serial transmission. However, the invention does not rule out two or more (or, if appropriate seven or eight) second lines being provided. When including multiple second lines, correspondingly large numbers of bits can be transmitted in parallel.

A data transmission to the logic circuit by the program-controlled device prevents collisions caused by simultaneous transmission in both directions. Because a request to transmit data is made by the program-controlled device, the data transmission to the logic circuit is enabled if the second line is recessive for a predefined time after a level change of the control signal. After the predefined time has expired, the second line is switched to the dominant state by the program-controlled device. As a result thereof, following a level change of the control signal, data transmission from the program-controlled device to the logic circuit is started.

With respect to the data transmission from the logic circuit to the program-controlled device, a collision is avoided by switching the second line to the recessive state with the program-controlled device before the predefined time has expired. This switching allows data transmission from the logic circuit to the program-controlled device.

Measures for receiving data by the program-controlled device include, maintaining the second line in the recessive state and allowing the control signal to assume the first level, after which the predefined time is started. The second line maintains the recessive state when the program-controlled device receives a request to receive. Furthermore, the second line remains recessive once it is in that state.

In accordance with a further object of the invention, a control signal (strobe) can be transmitted from the program-controlled device to the logic circuit by a first line. Furthermore, a bidirectionally usable second line that connects the program-controlled device to the logic circuit can be placed in the dominant state by the logic circuit if the logic circuit is to transmit data.

Other features which are considered as characteristic for the invention are set forth in the appended claims.

Although the invention is illustrated and described herein as embodied in method and system for exchanging data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The term component is used below to refer to the microcontroller and to the logic circuit. The entirety of the two components including the programs running in both components will be referred to below as a system.

Figure 1:
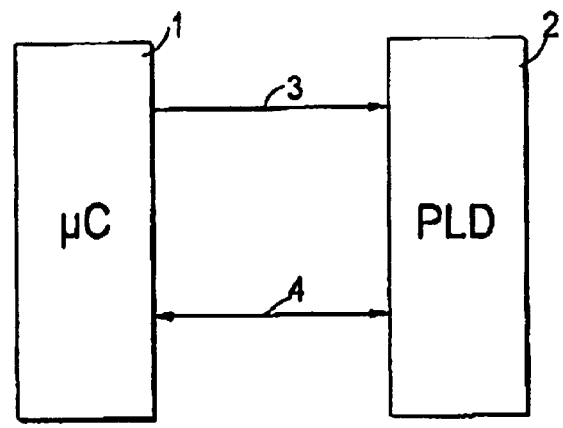
FIG. 1 is a block circuit diagram of an system.

Referring now to the figures of the drawings in detail and first, particularly to FIG. 1 thereof, there is shown a microcontroller that can be part of a control unit for various purposes. One such purpose is in the electronic system of a motor vehicle. Some of the functions of the overall system are performed by a logic circuit 2, which is embodied, for example, as a PLD (Programmable Logic Device). The microcontroller (µC) 1 operates as what is referred to as a Master, while the logic circuit 2 not only operates as what is referred to as a Slave but also in certain cases engages actively in the exchange of data and signals a transmission of data. This may be necessary, for example, if the logic circuit 2 also receives signals from other devices. Such a function is provided, for example, in a radio receiver for a central locking system of a motor vehicle.

The microcontroller 1 and the logic circuit 2 are connected via a first line 3 that is operated unidirectionally and conducts a control signal that is designated below as strobe. At least one further line 4 is used for bidirectional transmission of data. Depending on the particular request, a plurality of lines 4, for example two, four or eight, may also be provided in parallel.

Figure 2:
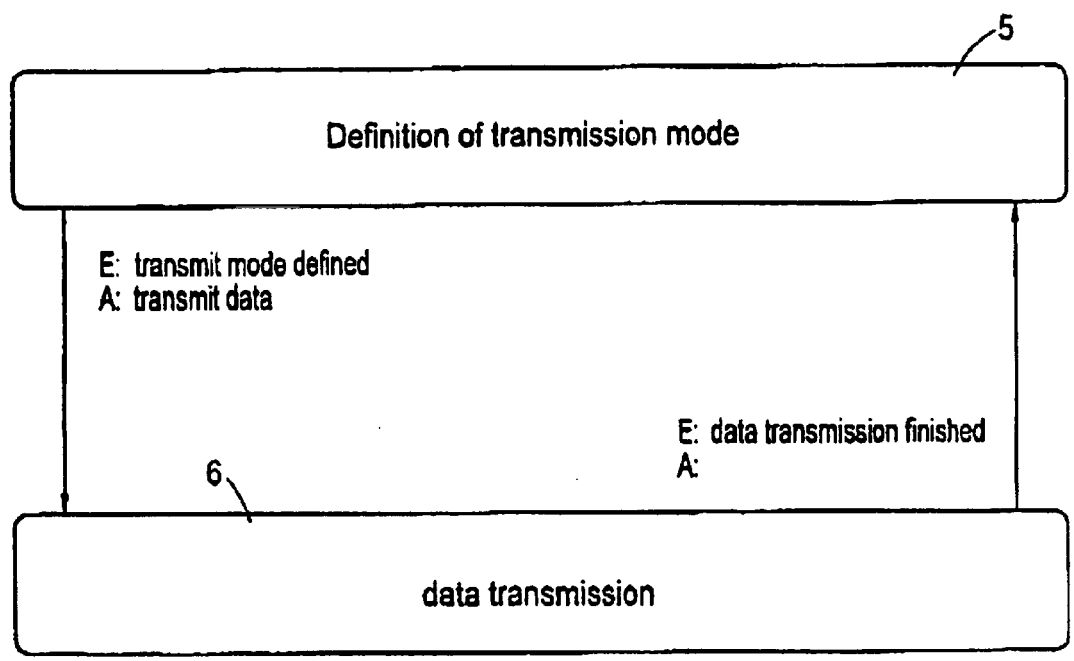
FIG. 2 is a state diagram of the system during the method.

FIG. 2 shows a state diagram, namely two states 5, 6 in which both the microcontroller 1 and the logic circuit 2 may be. In the first state, the transmission mode is determined and, in the second state 6, the data transmission takes place. A changeover from state 5 into the state 6 takes place as a result of an event in the program run of one of the two components that determines a transmission mode, for example the transmission of data from the microcontroller to the logic circuit. As a response or as an activity responding to this event, the system goes into the data transmission state. If a message occurs in this state, for example as a result of an end sign of the transmitted data—indicating that the data transmission is terminated—the system goes back into the state 5.

Figure 3:
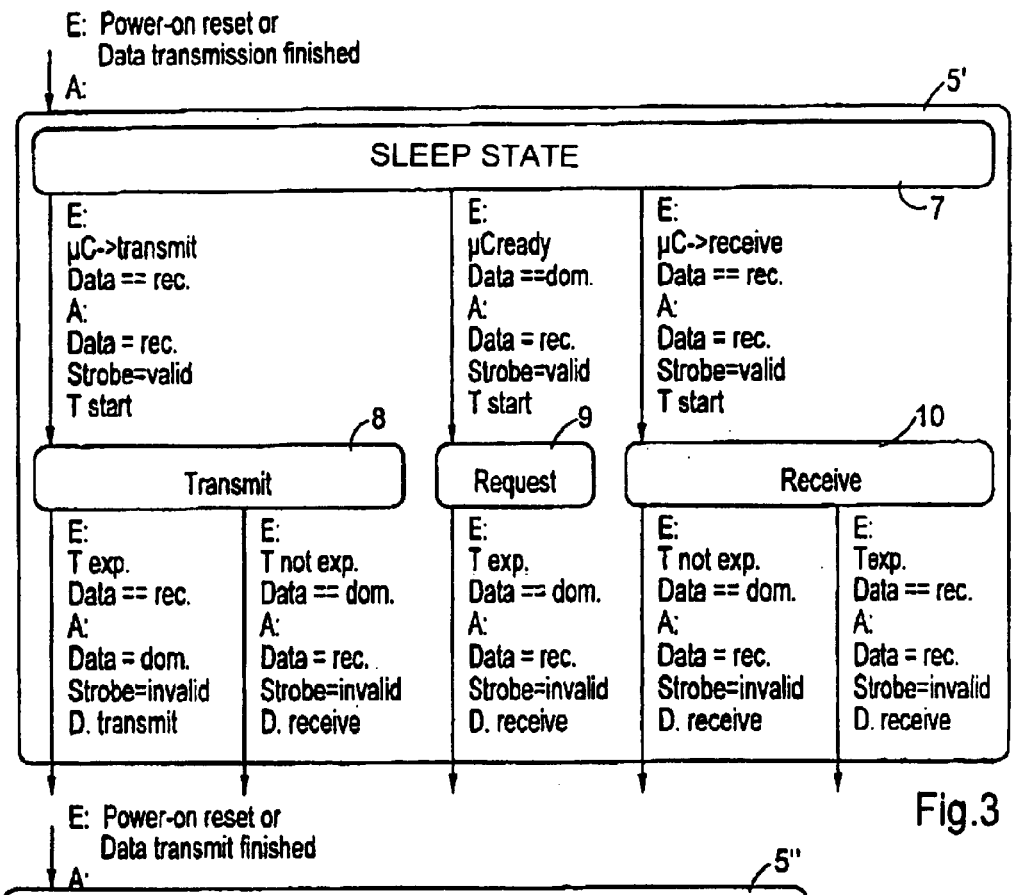
FIG. 3 is a state diagram of the system during the method.

The state diagram according to FIG. 3 explains the determination of the transmission mode 5' by the microcontroller 1 in an illustration that is more detailed than FIG. 2. Within the state 5, the microcontroller can assume a sleep state 7 and a transmit state 8, a request state 9, and a receive state 10. The microcontroller goes into the state 5' at the event E "Data transmission terminated" or "Reset" after switching on (Power-on Reset).

The microcontroller goes into the transmit state 8 from the Sleep state 7 as a result of the events in which the program requests a transmission (Transmit) in the microcontroller and the data line 4 (FIG. 1) is switched to the recessive state. The data line then remains in this state while the strobe line assumes a first state (Valid) and a timer T is started. The timer T is used to give the logic circuit priority during the data transmission over the transmission of data by the microcontroller. This avoids collisions caused by both components transmitting at the same time. To this extent, the logic circuit has priority because, in its case, the programming possibilities of delaying a transmission process once it has been prepared are not provided as they are in a microcontroller.

If the transmit state 8 is reached, the further activities A depend on whether the timer T has expired and whether the data line is switched to the recessive or dominant state. Switching to the dominant state means at this point that the logic circuit has transmitted a request. For this reason, the data line is kept in the recessive state by the microcontroller while the strobe assumes the invalid state so that a "Receive" data transmission (viewed in terms of the state of the microcontroller) can begin. However, if the data line is recessive, it is switched to the dominant state and the strobe is switched to invalid. In this way, the microcontroller can start to transmit data.

If the microcontroller is already in the sleep state 7 and the data line is dominant, the Request state 9 is reached by virtue of the fact that the data line is set to the recessive state, from the point of view of the microcontroller, and the strobe is set to valid. The timer T is also started. After the timer T has expired and if the data line is dominant, that is to say has been switched to dominant by the logic circuit, the same state "Receive" is reached again from this state. If the program in the microcontroller requests the reception of data and if the data line is recessive, the system goes from the Sleep state 7 into the "Receive" state 10, after which the "Receive" state is reached again after the timer has expired and the data line is recessive again.

Figure 4:
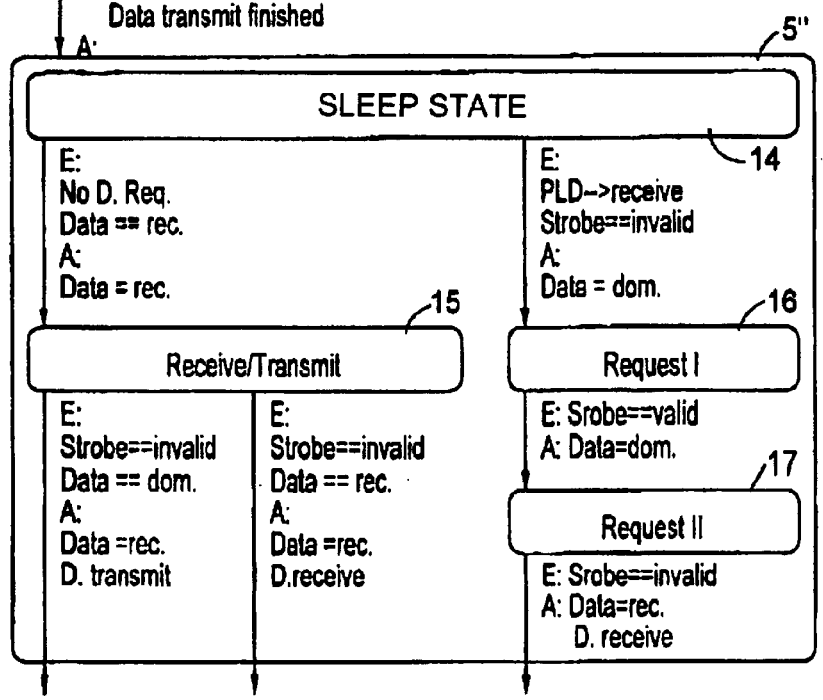
FIG. 4 is a state diagram of the system during the method.

FIG. 4 shows the determination of the transmission mode 5" in the logic circuit. A sleep state 14 again is the start. From this state, the data line is switched to the recessive state if there is no request and the strobe signal is valid. In this way, a state 15 is reached which signifies "Receive or Transmit" for the logic circuit, in each case at the initiative of the microcontroller. From this state, when the strobe is invalid and the data is dominant, the data line is switched to the recessive state, after which the microcontroller can transmit and the logic circuit can receive. However, if the data line is recessive, a data transmission from the logic circuit to the microcontroller can take place.

The sleep state 14 can also be exited if there is a request for transmission of data from the logic circuit and the strobe signal is set to invalid. The data line is then set to the dominant state by the logic circuit and a state 16 request I is reached. If the strobe is then set to valid (by the microcontroller), the data line remains in the dominant state. A further state 17 request II is reached, from which the data line is set to the recessive state after the strobe has changed to invalid, and the data transmission from the logic circuit to the microcontroller can start (Receive).

Figure 5:
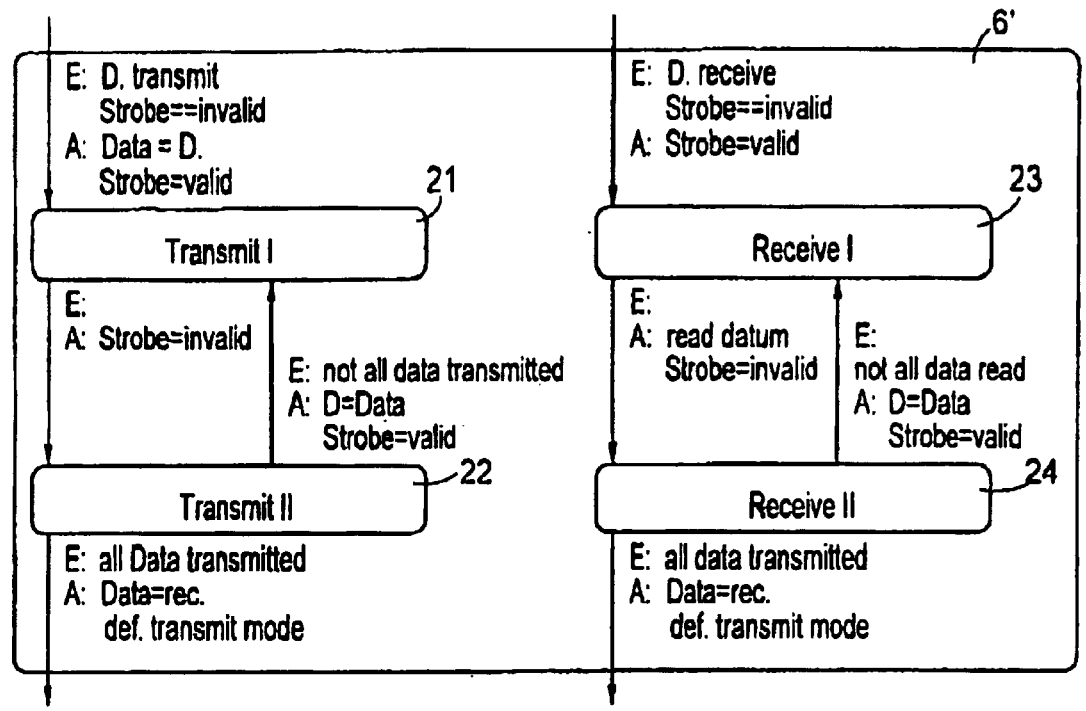
FIG. 5 is a state diagram of the system during the method.

The data transmission of the microcontroller is illustrated in FIG. 5. After the microcontroller 1 and the logic circuit 2 have been prepared for the transmission of data according to FIGS. 3 and 4, the state 6' and 6" (FIG. 6) is reached in both components. When data is transmitted to the logic circuit, after the event in which the strobe is set to the level invalid, the data line is set to the transmitted date and the strobe is set to valid. In this way, the state 21 transmit I is reached, after which the strobe is set to invalid after the transmission of the one data item (a bit or a byte or another group of bits). In the state 22 transmit II it is then tested whether all the data has been transmitted. If this is not the case, the next data item is transmitted at 21, but if all the data has been transmitted, the data line is set to the recessive state after the state 22. A similar procedure is adopted in the microcontroller with the states 23, 24 for the reception of data from the logic circuit.

Figure 6:
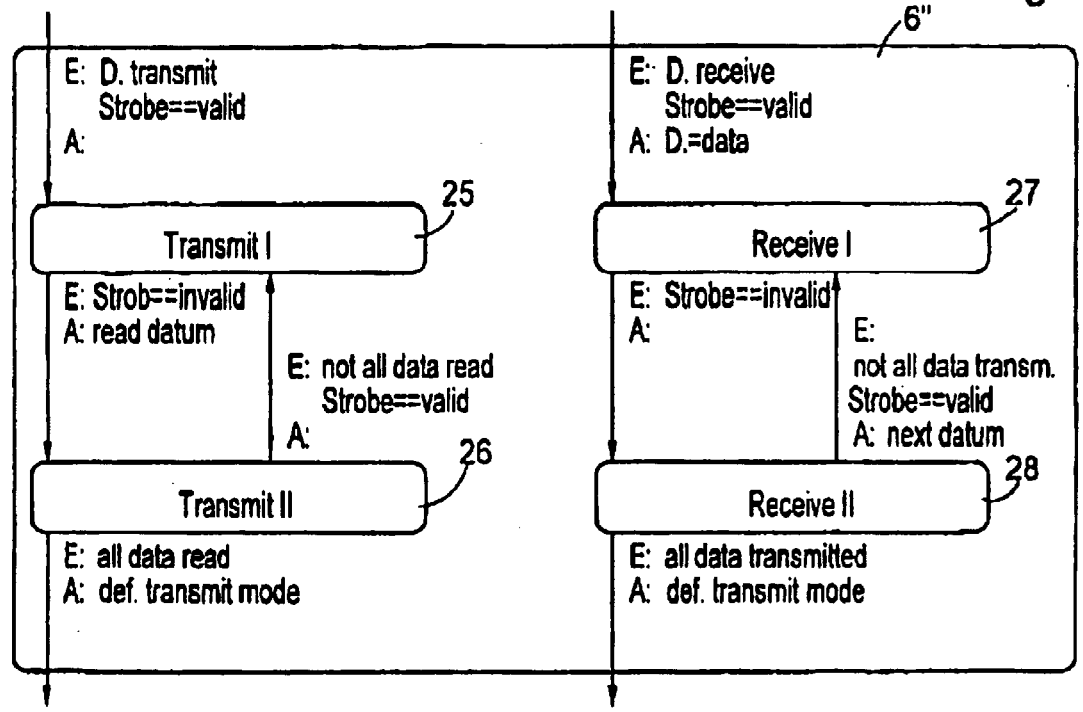
FIG. 6 is a state diagram of the system during the method.

FIG. 6 shows the corresponding processes in the logic circuit for the transmission of data to the logic circuit (states 25, 26)—transmit I and transmit II and states 27 and 28 for the transmission in the direction to the microcontroller—receive I and receive II.

We claim:

1. A method for exchanging data between a program-controlled device and a logic circuit, which comprises:

providing a first single line connecting the program-controlled device and the logic circuit;

providing a bidirectionally usable second single line connecting the program-controlled device and the logic circuit;

transmitting a control signal from the program-controlled device to the logic circuit over the first single line; and placing the second single line in a dominant state with the logic circuit when the logic circuit is to make a serial data transmission.

2. The method according to claim 1, which further comprises using a microcontroller as the program-controlled device.

3. The method according to claim 1, which further comprises:

requesting data to be transmitted by the program-controlled device;

changing a level of the control signal;

enabling data transmission to the logic circuit by maintaining a recessive state in the second line for a pre-determined time after the change in level of the control signal;

switching the second line to the dominant state by the program-controlled device after the predefined time has expired; and starting a data transmission from the program-controlled device to the logic circuit after changing the level of the control signal.

4. The method according to claim 3, which further comprises switching the second line to the recessive state by the program-controlled device before the predefined time has expired to allow data transmission from the logic circuit to the program-controlled device.

5. The method according to claim 1, which further comprises:

sending a request to receive from the program in the program-controlled device;

placing the second line in the recessive state;

maintaining the second line in the recessive state;

placing the control signal in an initial level; and waiting for the predefined time.

6. A system for exchanging data, comprising:

a program-controlled device;

a logic circuit;

a first single line conducting a control signal from said program-controlled device to said logic circuit; and a bidirectionally usable, second single line connecting said program-controlled device to said logic circuit, said second single line being placeable in a dominant state by said logic circuit when a serial data transmission is to be made by said logic circuit.

7. The system according to claim 6, wherein said program-controlled device is a microcontroller.

8. The system according to claim 6, wherein the control signal is a strobe.

9. The system according to claim 6, wherein:

said second line carries a control signal;

said program-controlled device and said logic circuit form programs for transmitting data;

said second line enables data transmission from said logic circuit to said program-controlled device by maintaining a recessive state for a predefined time after a level change of the control signal and switching said second line to the dominant state by the program-controlled device after the predefined time has expired; and said program-controlled device starts to transmit data to the logic circuit following the level change of the control signal.

10. The system according to claim 9, wherein said program-controlled device switches said second line to the recessive state before the predefined time has expired to enable data transmission from said logic circuit to said program-controlled device.

11. The system according to claim 6, wherein:

said second line is in the recessive state; and said program-controlled device requests to receive data, maintains said second line in the recessive state, places the control signal at a first level, and starts counting the predefined time.

* * * * *